United States Patent
Beylin et al.

(10) Patent No.: US 10,061,591 B2
(45) Date of Patent: Aug. 28, 2018

(54) REDUNDANCY ELIMINATION IN SINGLE INSTRUCTION MULTIPLE DATA/THREAD (SIMD/T) EXECUTION PROCESSING

(71) Applicant: SAMSUNG ELECTRONICS COMPANY, LTD., Suwon, Gyeonggi-Do (KR)

(72) Inventors: Boris Beylin, Palo Alto, CA (US); John Brothers, Calistoga, CA (US); Santosh Abraham, Pleasanton, CA (US); Lingjie Xu, San Jose, CA (US); Maxim Lukyanov, Sunnyvale, CA (US); Alex Grosul, Santa Clara, CA (US)

(73) Assignee: Samsung Electronics Company, Ltd. (KR)

( * ) Notice: Subject to any disclaimer, the term of this patent is extended or adjusted under 35 U.S.C. 154(b) by 522 days.

(21) Appl. No.: 14/632,651

(22) Filed: Feb. 26, 2015

(65) Prior Publication Data

US 2015/0378733 A1 Dec. 31, 2015

Related U.S. Application Data

(60) Provisional application No. 62/018,000, filed on Jun. 27, 2014.

(51) Int. Cl.
*G06F 9/38* (2018.01)
*G06F 9/46* (2006.01)

(52) U.S. Cl.
CPC .......... *G06F 9/3887* (2013.01); *G06F 9/3828* (2013.01); *G06F 9/3851* (2013.01); *G06F 9/46* (2013.01)

(58) Field of Classification Search
CPC .................................................. G06F 9/3887
See application file for complete search history.

(56) References Cited

U.S. PATENT DOCUMENTS

| 5,966,528 A | 10/1999 | Wilkinson et al. |
| 7,081,902 B1 | 7/2006 | Crow et al. |

(Continued)

FOREIGN PATENT DOCUMENTS

| EP | 0570950 A2 | 11/1993 |
| EP | 1616289 A4 | 4/2008 |

(Continued)

OTHER PUBLICATIONS

Liu, T. et al., "DTHREADS: Efficient and Deterministic Multi-threading", Proceedings of the 23rd ACM Symposium on Operating Systems Principles (SOSP'11), Oct. 23, 2011, pp. 327-336, ACM, United States.

(Continued)

*Primary Examiner* — Aimee Li
*Assistant Examiner* — William V Nguyen
(74) *Attorney, Agent, or Firm* — Innovation Counsel LLP

(57) ABSTRACT

A method for reducing execution of redundant threads in a processing environment. The method includes detecting threads that include redundant work among many different threads. Multiple threads from the detected threads are grouped into one or more thread clusters based on determining same thread computation results. Execution of all but a particular one thread in each of the one or more thread clusters is suppressed. The particular one thread in each of the one or more thread clusters is executed. Results determined from execution of the particular one thread in each of the one or more thread clusters are broadcasted to other threads in each of the one or more thread clusters.

29 Claims, 13 Drawing Sheets

(56) References Cited

U.S. PATENT DOCUMENTS

| | | |
|---|---|---|
| 7,100,164 B1 | 8/2006 | Edwards |
| 7,788,468 B1 * | 8/2010 | Nickolls ............. G06F 9/30087 |
| | | 712/22 |
| 8,140,830 B2 | 3/2012 | Schwinn et al. |
| 8,190,807 B2 | 5/2012 | Reid et al. |
| 8,392,669 B1 | 3/2013 | Nyland et al. |
| 8,416,468 B2 | 4/2013 | Underwood et al. |
| 8,423,983 B2 | 4/2013 | Gschwind |
| 8,677,105 B2 | 3/2014 | Abdallah et al. |
| 8,751,771 B2 | 6/2014 | Fahs et al. |
| 8,752,018 B2 | 6/2014 | Jones et al. |
| 2008/0098207 A1 | 4/2008 | Reid et al. |
| 2009/0150890 A1 | 6/2009 | Yourst et al. |
| 2009/0293061 A1 | 11/2009 | Schwinn et al. |
| 2010/0161948 A1 | 6/2010 | Abdallah |
| 2011/0022817 A1 | 1/2011 | Gaster et al. |
| 2012/0246657 A1 | 9/2012 | Abdallah |
| 2012/0259843 A1 | 10/2012 | Child |
| 2013/0042090 A1 | 2/2013 | Krashinsky |
| 2013/0113809 A1 | 5/2013 | Kong et al. |
| 2013/0198494 A1 | 8/2013 | Grover et al. |
| 2013/0246737 A1 * | 9/2013 | Eichenberger ...... G06F 9/30021 |
| | | 712/201 |
| 2013/0346781 A1 * | 12/2013 | Chung ...................... G06F 9/30 |
| | | 713/324 |
| 2014/0096117 A1 * | 4/2014 | Tanaka ................... G06F 8/434 |
| | | 717/149 |
| 2014/0130052 A1 | 5/2014 | Lin et al. |
| 2014/0149719 A1 | 5/2014 | Tabaru |
| 2014/0181475 A1 | 6/2014 | Abdallah |
| 2014/0201450 A1 | 7/2014 | Haugen |
| 2015/0100764 A1 * | 4/2015 | Tarolli ................ G06F 9/30072 |
| | | 712/216 |
| 2015/0378741 A1 | 12/2015 | Lukyanov et al. |

FOREIGN PATENT DOCUMENTS

| | | |
|---|---|---|
| EP | 2291737 A2 | 3/2011 |
| WO | 2006029297 A2 | 3/2006 |

OTHER PUBLICATIONS

Perrone, L.F. et al., "The Design of an Output Data Collection Framework for NS-3", Proceedins of the 2013 Winter Simulation Conference (WSC), Dec. 8-11, 2013, pp. 2984-2995, IEEE, United States.

Van De Loosdrecht, J., "Accelerating Sequential Computer Vision Algorithms Using Commodity Parallel Hardware", Sep. 2013, pp. 1-287, Instituid Teichneloaiochta Luimnigh, Netherlands.

* cited by examiner

REDUNDANCY ELIMINATION IN SINGLE INSTRUCTION MULTIPLE DATA/THREAD (SIMD/T) EXECUTION PROCESSING

CROSS-REFERENCE TO RELATED APPLICATION

This application claims the priority benefit of U.S. Provisional Patent Application Ser. No. 62/018,000, filed Jun. 27, 2014, which is incorporated herein by reference in its entirety.

TECHNICAL FIELD

One or more embodiments generally relate to a single-instruction multiple data/thread (SIMD/T) processing environments and, in particular, to reducing execution of redundant threads for reducing resource usage in a SIMD/T processing environment.

BACKGROUND

In a SIMD/T execution model, multiple different physical threads (SIMD channels) execute the same code with different input data. This execution model is widely used in graphical processing unit (GPU) hardware (HW) both for graphics and, with the increase of general-purpose computing on graphics processing units (GPGPU) programming, for many non-graphical applications.

SUMMARY

One or more embodiments generally relate to reducing execution of redundant threads for reducing resource usage in a SIMD/T processing environment. In one embodiment, a method provides for reducing execution of redundant threads in a processing environment and includes detecting threads that include redundant work among many different threads. Multiple threads from the detected threads are grouped into one or more thread clusters based on determining same thread computation results. Execution of all but a particular one thread in each of the one or more thread clusters is suppressed. The particular one thread in each of the one or more thread clusters is executed. Results determined from execution of the particular one thread in each of the one or more thread clusters are broadcasted to other threads in each of the one or more thread clusters.

In one embodiment, a non-transitory computer-readable medium having instructions which when executed on a computer perform a method comprising: detecting threads that include redundant work among a plurality of different threads. Multiple threads from the detected threads are grouped into one or more thread clusters based on determining same thread computation results. Execution of all but a particular one thread in each of the one or more thread clusters is suppressed. The particular one thread in each of the one or more thread clusters is executed. Results determined from execution of the particular one thread in each of the one or more thread clusters are broadcasted to other threads in each of the one or more thread clusters.

In one embodiment, a graphics processor for an electronic device comprises: one or more processing elements coupled to a memory device. In one embodiment, the one or more processing elements: detect threads that include redundant work among a plurality of different threads. Multiple threads from the detected threads are grouped into one or more physical thread clusters based on determining same thread computation results. Execution of all but a particular one thread in each of the one or more thread clusters are suppressed. The particular one thread in each of the one or more thread clusters is executed. Results determined from execution of the particular one thread in each of the one or more thread clusters are broadcasted to other threads in each of the one or more thread clusters.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 8 shows an example of a WARP with two non-trivial thread clusters, according to an embodiment.

FIG. 9 shows an example of a WARP with one sparse thread cluster, according to an embodiment.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to reducing execution of redundant threads for reducing resource usage in a SIMD/T processing environment. One or more embodiments may organize multiple instructions into schedulable structure referred to as a trace. A trace is a region of code that contains a number of instructions and the following properties: a trace will not begin execution until specified events have occurred; a trace will not begin execution until all required resources are available; and a trace once entered into execution, executes to completion. The trace bundles a plurality of instructions into a single schedulable unit. The trace contains a header (e.g., a trace header). The trace header includes a list of resources that the multiple instructions in the trace need or require.

In one example the trace header is organized to simplify matching of resource requests to available resources, and the SIMT scheduling process. Because the trace runs to completion, the data-path may be augmented with a small low overhead tunnel register file. The tunnel register file does not persist across trace boundaries and thus may be considered inexpensive with respect to context switching and SIMT scheduling.

In one embodiment, a method provides for reducing execution of redundant threads in a processing environment and includes detecting threads that include redundant work among many different threads. Multiple threads from the detected threads are grouped into one or more thread clusters based on determining same thread computation results. Execution of all but a particular one thread in each of the one or more thread clusters is suppressed. The particular one thread in each of the one or more thread clusters is executed. Results determined from execution of the particular one thread in each of the one or more thread clusters are broadcasted to other threads in each of the one or more thread clusters.

Figure 1:
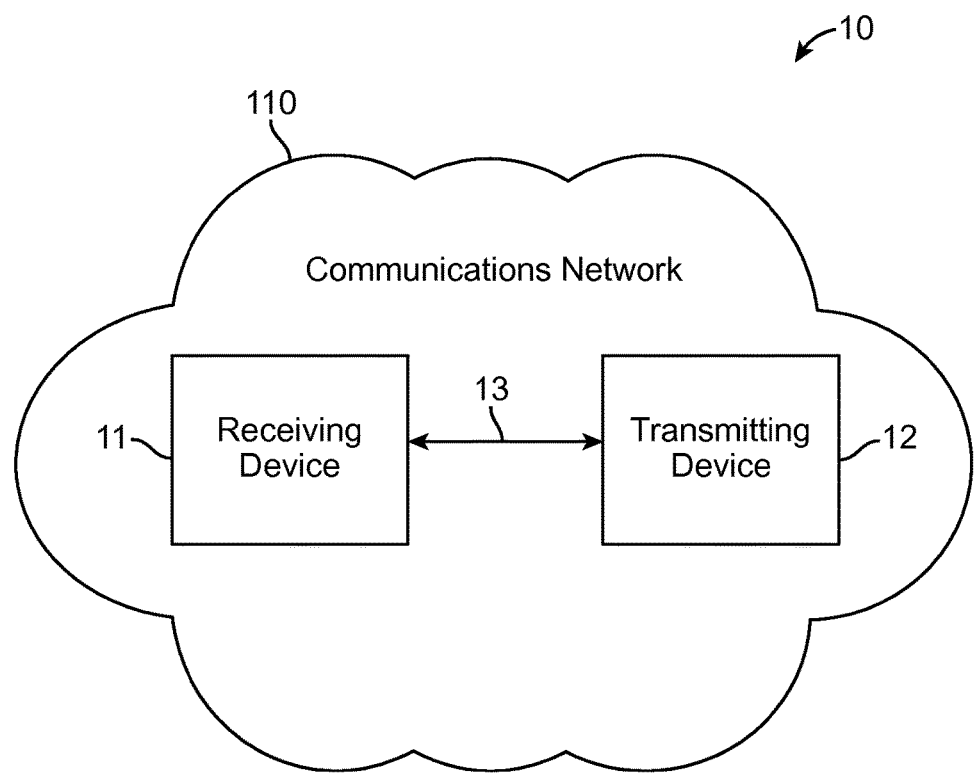
FIG. 1 shows a schematic view of a communications system, according to an embodiment.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), BLUETOOTH®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a BLACKBERRY®). Such protocols may include, for example, GSM, GSM plus EDGE, CDMA, quadband, and other cellular protocols. In another example, a long range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include a mobile telephone devices, television systems, cameras, camcorders, a device with audio video capabilities, tablets, wearable devices (e.g., wearable wrist or watch type devices, pendants, head-worn devices, pins, etc.), and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, or combinations of these (e.g., video conferences).

Figure 2:
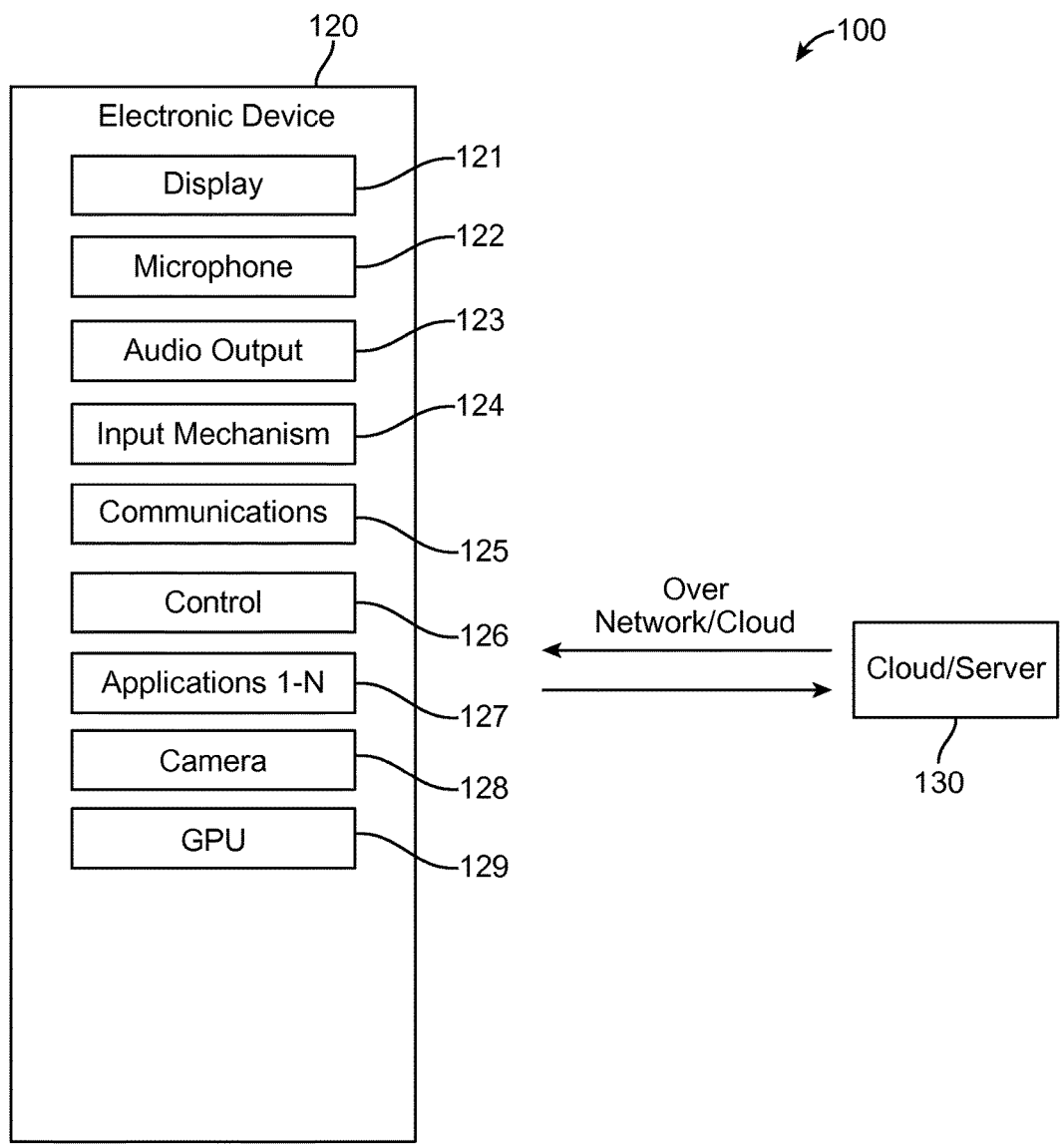
FIG. 2 shows a block diagram of an architecture for a system including a mobile device including a graphical processing unit (GPU), according to an embodiment.

FIG. 2 shows a functional block diagram of an architecture system 100 that may be used for graphics processing in an electronic device 120. Both the transmitting device 12 and receiving device 11 may include some or all of the features of the electronics device 120. In one embodiment, the electronic device 120 may comprise a display 121, a microphone 122, an audio output 123, an input mechanism 124, communications circuitry 125, control circuitry 126, a camera interface 128, a GPU 129, and any other suitable components. In one embodiment, applications 1-N 127 are provided and may be obtained from a cloud or server 130, a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., BLUETOOTH® headphones or a BLUETOOTH® headset).

In one embodiment, the display 121 may include any suitable screen or projection system for providing a display visible to the user. For example, display 121 may include a screen (e.g., an LCD screen) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), BLUETOOTH®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the BLUETOOTH® protocol to couple the electronics device 120 with a BLUETOOTH® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an automatic speech recognition (ASR) application, a dialog application, a map application, a media application (e.g., QuickTime, MobileMusic.app, or MobileVideo.app), social networking applications (e.g., FACEBOOK®, TWITTER®, etc.), an Internet browsing application, etc. In some embodiments, the electronics device 120 may include one or multiple applications operative to perform communications operations. For example, the electronics device 120 may include a messaging application, a mail application, a voice-mail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera interface 128 comprises one or more camera devices that include functionality for capturing still and video images, editing functionality, communication interoperability for sending, sharing, etc. photos/videos, etc.

In one embodiment, the GPU 129 comprises processes and/or programs for processing images and portions of images for rendering on the display 121 (e.g., 2D or 3D images, High definition (HD), ultra-HD (UHD), etc.). In one or more embodiments, the GPU 129 may comprise GPU hardware and memory (e.g., a unified heap architecture (UHA) 410 (FIG. 4), static random access memory (SRAM), dynamic RAM (DRAM), core processor(s), cache, etc.).

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
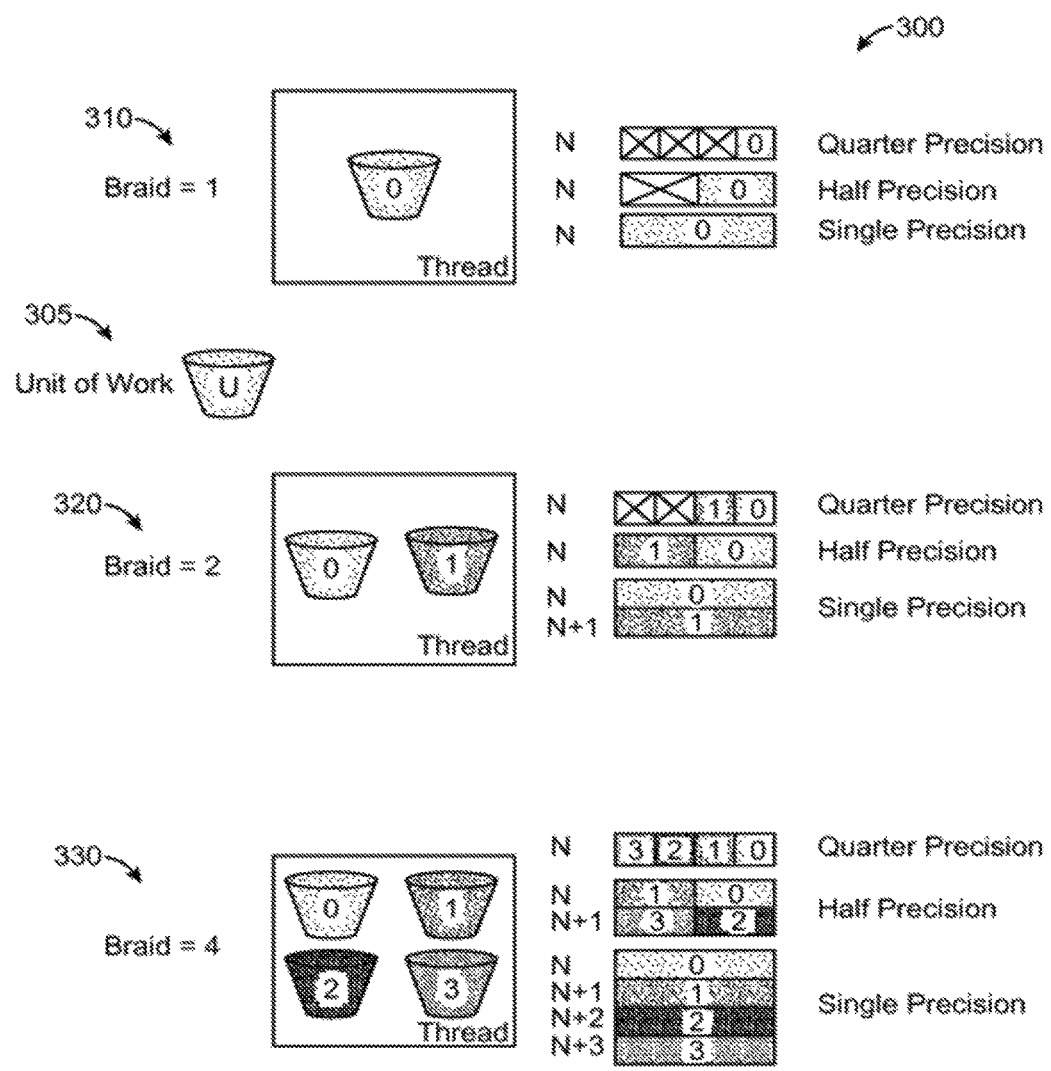
FIG. 3 illustrates packing including one or more units of work.

FIG. 3 shows a diagram 300 of example WARP structures including one or more units of work. In one example, a unit of work is a set of input data that will pass through a shader <program> to produce an output data set. In one embodiment, the compiler bundles 1, 2, or 4 units of work into a single thread (also may be referred to as an execution thread) in order to efficiently process data of different sizes. This bundle is known as a pack. The number of elements in a pack determines how less than full width computation are performed, as shown in the diagram 300. In one example, braid-1 310 shows a thread with a unit of work 305 0, braid-2 320 shows a thread with units of work 305 0 and 1, and braid-4 330 shows a thread with units of work 305 0, 1, 2 and 3.

In one example, a number of work units 305 are bound into a thread and then a number of threads are bound together to execute a shader <program> into a structure referred to as a WARP. A WARP binds a multiplicity of work units 305 into a single point of control. In one example embodiment, the WARP may contain up to 32 threads, and a compiler of a GPU (e.g., part of the GPU 129, FIG. 2) may pack up to 4 units of work 305 (e.g., braid-4 330) into a single thread. In one example embodiment, the packing factor determines the placement of input data into the threads of a WARP. A processing element 400 (FIG. 4) may process up to 8 WARPs. In one example, each WARP is associated with 64-registers in the scalar register file. In one example, each scalar register is 32-bits in size. A 3-bit WARP Identifier is concatenated with the scalar register specifier in an instruction in order to fully address a scalar register file. In one example embodiment, all threads in the WARP share the same scalar register file.

In one example, a thread is a point of control within a WARP. Each thread is associated with a <thread> Register File. In one example, a thread may be allocated as few as 8 and as many as 256 registers with 8 register granularity. The WARP carries a register base address which relocates instruction register specifiers into Register File addresses. The register file 420 (FIG. 4) contains 32 KBytes of storage, which may be allocated to various WARPs. In one example, when the shader program uses 32 or fewer registers per thread, all 8 WARPs may be active simultaneously. WARPs from different shaders may have different sized Register Files. The size of a given register file 420 is found in the shader header 610 (FIG. 5).

In one example, a 2-bit WARP braiding field identifies the mode of operation of the threads within the WARP. The braiding enables the compiler of the GPU to produce optimal codes when shader programs utilize half precision and quarter precision instructions. The instructions compute 2 or 4 units of work 305 in a single instruction per thread when braided. In one example, the units of work 305 are governed by an execution mask, one bit of each mask governs a unique unit of work over the WARP. In one example, each instruction in a shader <program> identifies the associated unit of work 305 so that it may be properly governed. The execution mask may be manipulated to effect predication and control transfer. In one example, a simple code sequence performs most of the manipulation with compares instructions with label instructions.

A WARP executes instructions on behalf of all bound threads in such a way that each instruction sees the results of the previous instruction and may use such as operands immediately via forwarding or with some delay by utilizing a tunnel file. In one example, a trace 650 (FIG. 6) is a shader program fragment and consists of a trace header 670 and a number of instructions 660-661. In one example, the trace header 670 may contain a set of resources that must be available prior to running the instructions 660-661 with the trace 650 and a set of bit vectors of outstanding <previous> request that must have been performed prior to scheduling this WARP back into execution. The WARP scheduler uses this information in deciding which WARP to schedule <next>.

In one example, a trace 650 (FIG. 6) has a limited maximum size (in the range of 64 to 128 instructions), and the compiler of the GPU will break a trace when the instruction sequence is too long, or when an instruction needs an outstanding request as an operand (such as a Load result or a texture result.). In one example, a WARP may be in one of four (4) states: Idle, Initializing, Executing, or Waiting. Once configured and initialized, the WARP may be scheduled into operation when the resources required are available. In one example, once scheduled the WARP will execute all of the instructions in a trace 650. This gives the WARP scheduler time to find a subsequent WARP that may enter execution (again).

Figure 4:
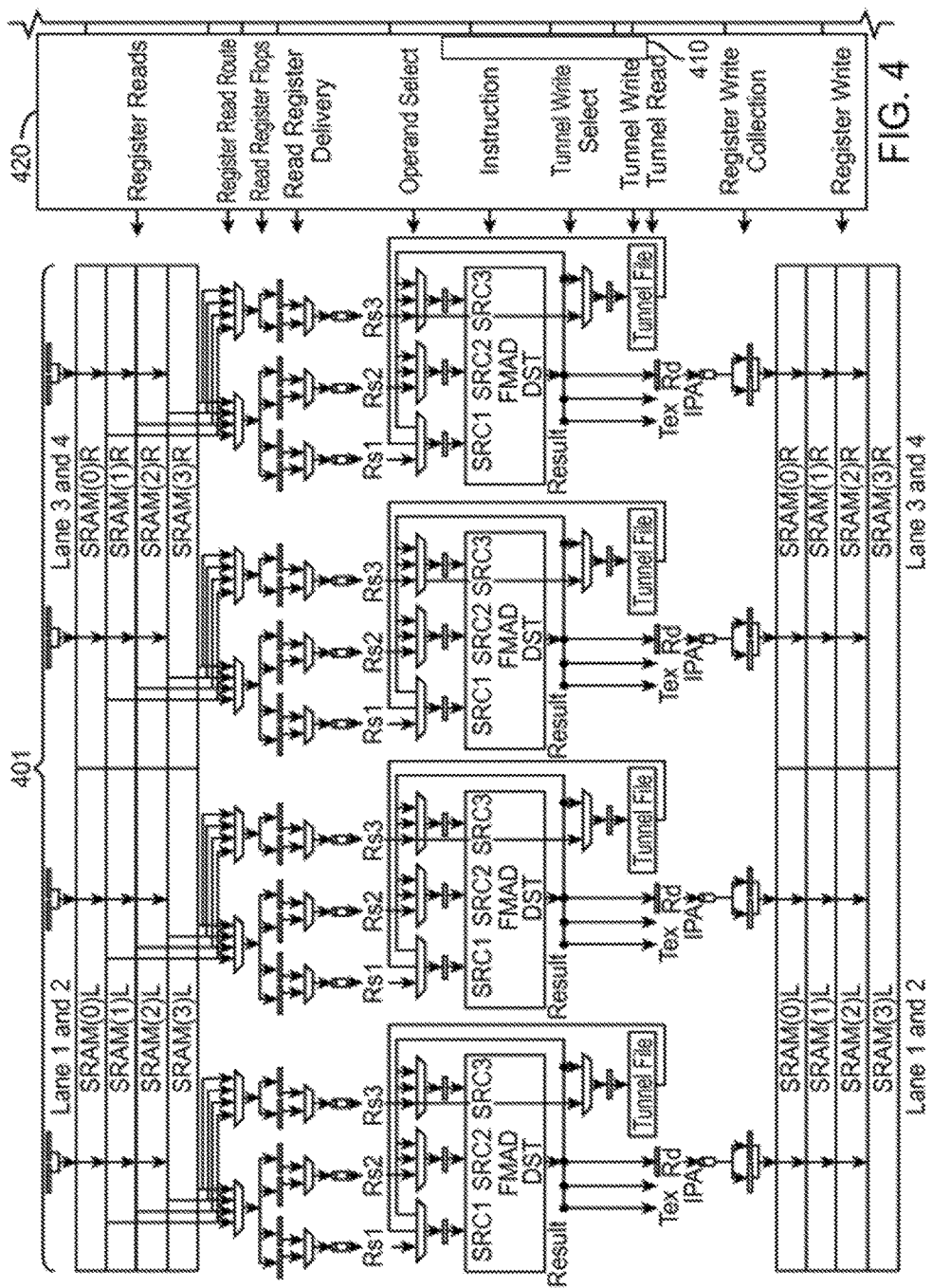
FIG. 4 shows an example processing element architecture that may be implemented with an embodiment.
Figure 4:
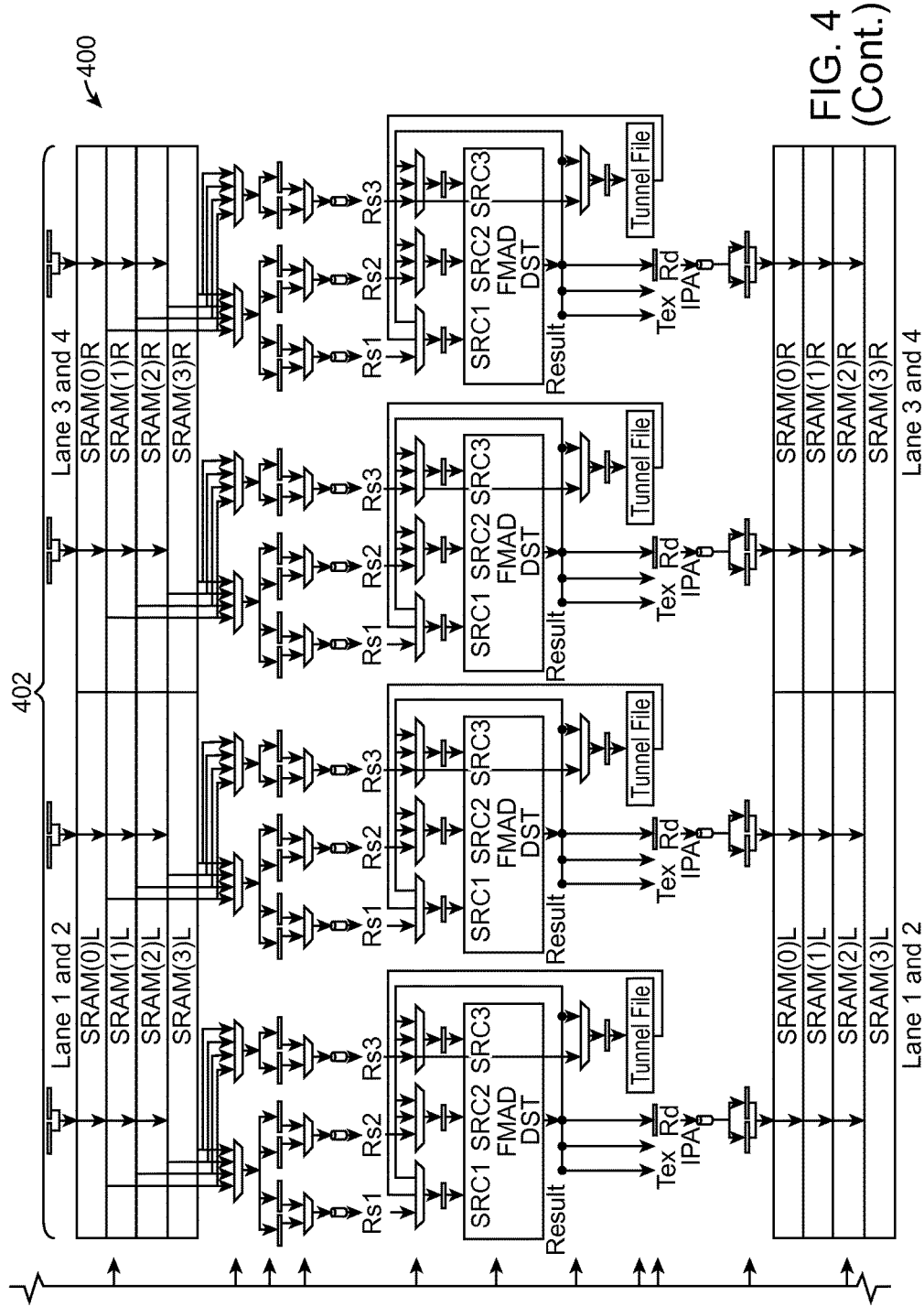
Figure 5:
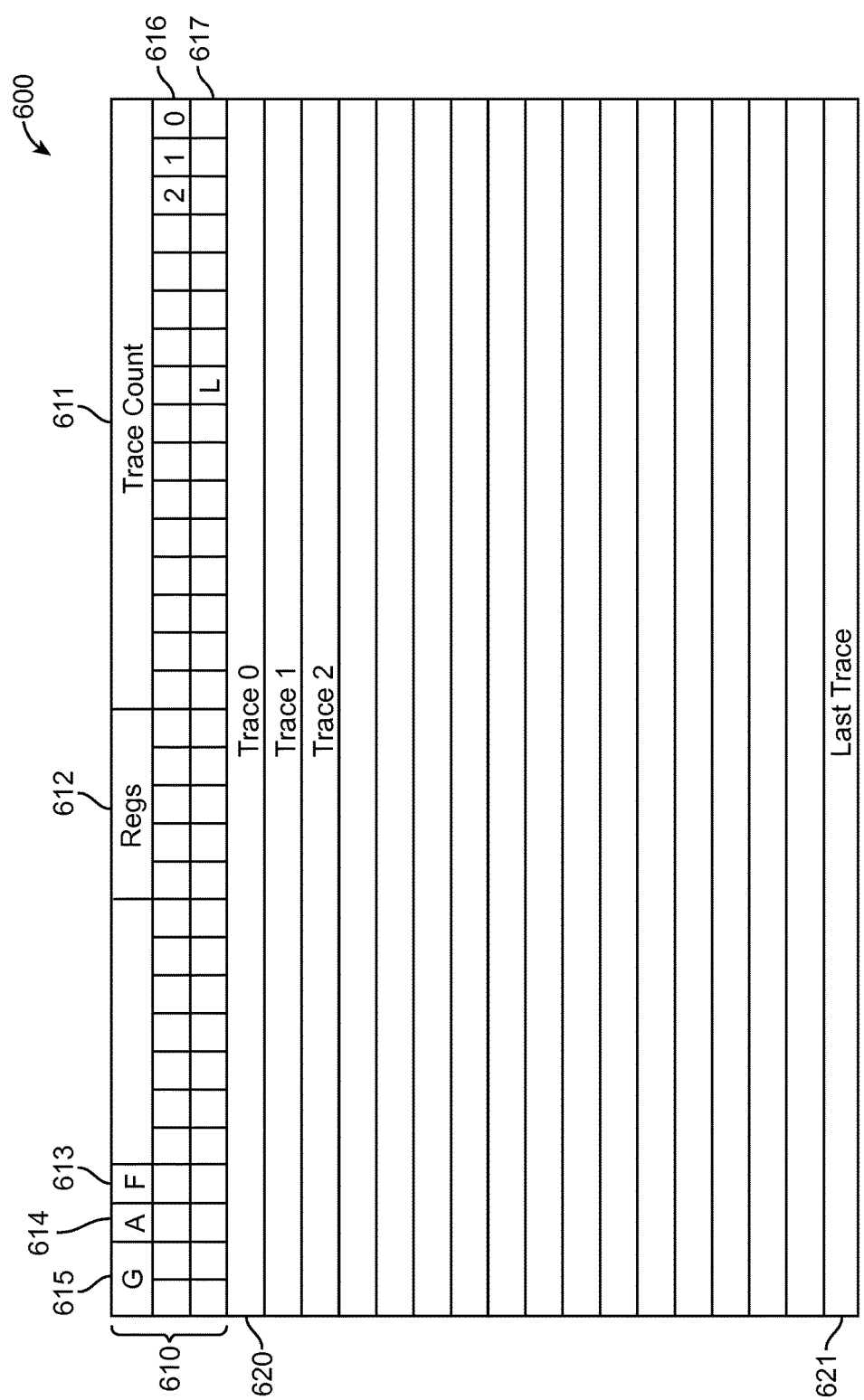
FIG. 5 shows an example shader format structure that may be implemented with an embodiment.

In one example, an Idle WARP may be assigned work units 305, assigned a shader program, and allocated a Register File 420 (FIG. 4). A shader constructor initializes a WARP by moving units of work 305 to the Register File 420, fixed function requests may be pre-processed, and then the WARP may be scheduled into execution. After Initialization WARPs toggle between the Waiting and Executing states until the end of the shader <program> at which time they return to the Idle state.

Figure 6:
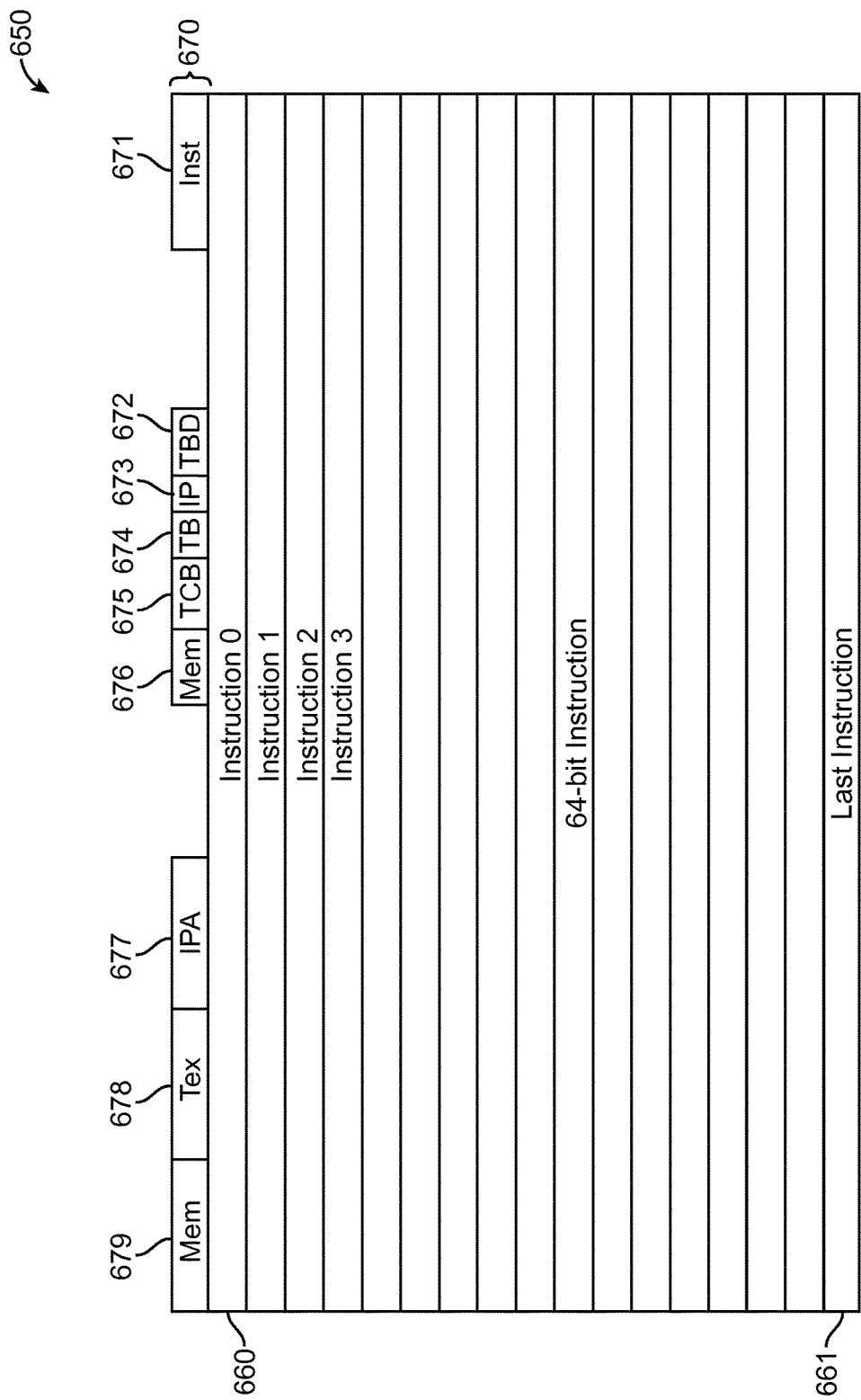
FIG. 6 shows an example trace format structure that may be implemented with an embodiment.

In one example, a WARP waits at a trace header 670 (FIG. 6). The trace header 670 contains the list of events that must take place before scheduling the WARP (back) into execution and resources required to run the trace to completion. Once the resources are available and the events have occurred, the WARP becomes a candidate. In one example, the WARP scheduler picks from among the contending WARP candidates for the next WARP to enter execution.

In one example, after the WARP is scheduled, the WARP scheduler preloads the Loop Buffer 410 (FIG. 4) by shipping the instructions 660-661 (FIG. 6) in a trace 650 from the instruction cache to the instruction decoder in the Loop Buffer 410. The instruction decoder decodes the instruction and places the decoded information into the Loop Buffer 410. In one example, once the trace 650 is installed in the Loop Buffer 410, the WARPs may be scheduled.

The WARP scheduler keeps track of which traces 650 are loaded into the Loop Buffer 410 and skips the installation if the trace 650 is already present. In one example, the WARP scheduler prioritizes WARPs pending on the same trace 650 over WARPs pending on a trace 650 yet to be loaded. A WARP may be configured to perform several units of work 305. In one example, the WARP may begin interpolation and texture accesses prior to the start of the pixel shader program. The register file allocation may be deferred until these computations are ready to deliver values to the register file 400 (FIG. 4). The register file 400 is then allocated and parts of it are prefilled with input data. In one example, any required scalar data is also written into the scalar register file.

FIG. 4 shows an example processing element 400 architecture that may be implemented by one or more embodiments. The processing element 400 comprises of 8 lanes 401-402 of computation, a register file 420, and a Loop Buffer 410. The Loop Buffer 410 contains a small instruction cache, the instruction decoder and the instruction sequencer. A register comprises a software value that may be delivered into computation and received from computation, and the register file 420 is an organization of SRAM instances that holds registers.

The FMAD units perform single precision floating point arithmetic instructions and are instrumental in μCode implementing the transcendental instructions. The Integer unit performs most integer arithmetic, logic operations, and memory address calculations. The BIT manipulation unit performs bit manipulation operations. In one example, pipeline time flows strictly downward except for the two forwarding paths back to the computation unit input multiplexers. The structures at the top of the processing element 400 are the same PDP SRAM components as the structures at the bottom of the processing element 400. In one example, the upper PDP SRAM components are used to read operands and deliver them into computation, while the lower PDP SRAM components are used to write computed values back into the register file 420.

In one example, for the processing element 400 only four operand flip-flops may satisfy the needs of the collectors. In one example embodiment, both normal sequencing {Single Precision, Half Precision and Quarter Precision} and special functional units (SFU) sequencing {Double Precision and certain Integer instructions} may be satisfied by accessing the SRAMs slightly differently. In one example, the registers are used in even-odd pairs for the first two accesses and in even-even and odd-odd pairs on the second set of accesses, which complicates the control but saves the number of required multiplexors.

FIG. 5 shows an example shader 600 format structure, that may be implemented by one or more embodiments. In one example, a shader 600 is composed of a shader header 610, a shader Active Search Table 616, an array of trace pointers 617 (one for each trace 620-621) in the shader 600), and a number of traces 600-621. In one example, a shader 600 begins on a cache line boundary (32 or 64 bytes), and each element in the shader 600 is one word in length (4 bytes).

In one example, the shader header 610 contains a trace count 611 of the number of traces 620-621, the register count 612 of the number of registers per thread, braid control information 615, and a Fixed Function bit 613. Immediately following the shader header 610 is the Active Search Table 616 that includes a number of traces divided by 32 of an Activating Search Optimizer 616.

In one example, the braid specifier of the braid control information 615 is used by the fixed function units in depositing a number of work units 305 (FIG. 3) into a single thread. In one example, the A bit 614 specifies if the Active Search Table is list present. The Active Search Table is a bit vector with one bit for each Trace 620-621. In one example, this list is used to rapidly search forward for the first activating instruction when the execution mask has become zero. The search is performed with a Find First Set circuit that may process 32 (or even 64) traces 620-621 per cycle in the search. Once the trace number is found the trace pointer list is indexed, and the WARP is scheduled to run that trace on its next opportunity.

The Active Search Optimizer tables may only be used in shaders with Forward Branching, CALLs and RETurns, and indirect Jumping. In one example, shaders 600 without these features may omit the tables by clearing the A bit 614 in the shader header 610. In one example, most shaders 610 are small enough such that these tables represent essentially no overhead. In one example, when the Fixed Function Specifier bit 613 (F) is set, the first trace 620-621 in a shader 600 (i.e., trace number 0 or Trace 0) contains instructions for fixed function units. These instructions run autonomously and potentially concurrently with WARP execution. In one example, if the F bit 613 is not set, then trace 0 is the first trace 620-621 to be executed by the shader program.

In one example, there are a number of Trace Pointers in the trace pointer array 617 once a particular trace 620-621 is identified by number. The trace pointer is used to access instructions over a 36-bit address space. The value in the pointer is shifted up by 4 bits (4 bits corresponds to 32-Byte cache lines and a 36-bit address space, 5 bits corresponds to 64-Byte cache lines and a 37-bit address space) to become the byte address of the instruction. In one example, shader threads receive an input data set, and compute an output data set.

In one example, another field in the shader header 610 includes data used to configure the Graphics Pipeline (e.g., graphics pipeline 1000, FIG. 10) to fill the registers correctly based on both group and size of input data item. In one example, an additional field in the shader header 610 includes data to configure the receiving Graphics Pipeline 1000 for the data being emitted. In one example, the additional fields may also be stored in a Graphics Pipeline Configuration data structure, which contain pointers to the shaders pertinent to this pipeline configuration.

In one example, when a Graphics Pipeline 1000 (FIG. 10) is configured, the driver initializes constant scratch from uniforms accessed by the shader programs which will run in this configuration. Constant scratch is shared across 4 processing elements 400 (FIG. 4) in a Shader core of a GPU. In one example, the pre-configuration eliminates the load instruction and its associated latency from the shader program. In one example, the input data set is placed into the register file 420 (FIG. 4) by shader constructors prior to the WARP starting to run the shader 600. The output data is emitted (typically) near the end of the shader 600 to other fixed function units.

FIG. 6 shows an example trace 650 format structure that may be implemented by one or more embodiments. In one example, a trace 650 is a series of instructions 660-661 that will be performed entirely from one scheduling event of one WARP. In one example, a trace 650 comprises a trace header 670, and a series of processing element 400 (FIG. 4) instructions 660-661. The trace header 670 contains a list of events that must have transpired prior to scheduling and a list of all resources that the instructions will require in order to run to completion. A trace 650 may contain forward and backwards branches, including loops. In one example, no instruction in a trace 650 may be dependent upon a result with unknowable latency.

The trace header 670 and all instructions 660-661 are 64-bits in size and begin on a cache line boundary. In one example, the trace header 670 contains bit vectors used to represent the outstanding events that must occur prior to this WARP being <re>scheduled. The trace header 670 includes fields for 8-outstanding memory references 679, 8-outstanding texture references 678, and 8-outstanding Interpolation references (IPA) 677. In one example, another 8-bit field exists for Texture Buffer Done (TBD) 672. The trace header 670 also contains field descriptors of the amount of buffer space required prior to this WARP being scheduled. In one example, the Mem field 676 describes how many memory references must be available in the Memory Address Buffer prior to scheduling the WARP. The TCB field 675 describes how many Texture Coordinates must be allocated in the Texture Coordinate Buffer prior to schedule. The TB field 674 describes the persistence of the TCB allocation, and the IP field 673 specifies the number of IPA requests (IPA is mainly Push Mode, the alternative is to send (Pull) Page Table Entries to the processing element 400 (FIG. 4) and have it compute its own interpolations).

In one example, the number of instructions 671 in a trace 650 is limited to the size of the Loop Buffer 410 (FIG. 4), for example between 64 and 128 pre-decoded instructions. In one example, since each instruction 660-661 processes up to 32 computations, 8 computations at a time over 4 beats of the pipeline 1100 (FIG. 11), once scheduled a trace 650 may take several hundred cycles to complete even without any looping behavior. This gives the WARP scheduler time to schedule the successor WARP and also to pre-load the Loop Buffer so that the WARP switch may take place between instructions 660-661 with little or no temporal overhead.

In one example, as a trace 650 executes, a number of outstanding events are recorded. The trace header 670 of the subsequent trace contains a bit-vector of outstanding events that must have become resolved prior to scheduling the WARP on the subsequent trace. In one example, this means WARPs are not scheduled into execution until all required outstanding results have been performed. This also means that the shader compiler may decide that some of the outstanding events are not needed in order to execute the subsequent trace.

In one example, as instructions 660-661 are decoded into the Loop Buffer 410 (FIG. 4), if the instruction activates threads, then the instruction decoded sets a bit in the Activate search table 616 (FIG. 5). In one example, if the execution mask ever becomes empty, this Activate search table 616 is used to rapidly skip instructions that have no chance of turning idle units of work back into an active state. In one example, along with the Activate search table 616 used by the WARP scheduler, once the execution mask becomes clear, then the only instructions that get executed are the ones that may turn inactive units of work 305 (FIG. 3) back into active units of work 305.

In one example, if the F bit 613 (FIG. 5) in the shader header 610 is set, trace 0 contains a list of instructions for fixed function units to perform autonomously or by means of stimulation from the shader 600. The latter is used to manage register file 420 (FIG. 4) pressure by the compiler of the GPU. In one example, this trace 650 generally consists of Interpolation Requests and Texture Requests; many of which may be processed prior to allocating a register file 420 to the WARP. In one example, only when the texture request is nearing completion does a register file 420 even need to be allocated to the waiting WARP.

Figure 7:
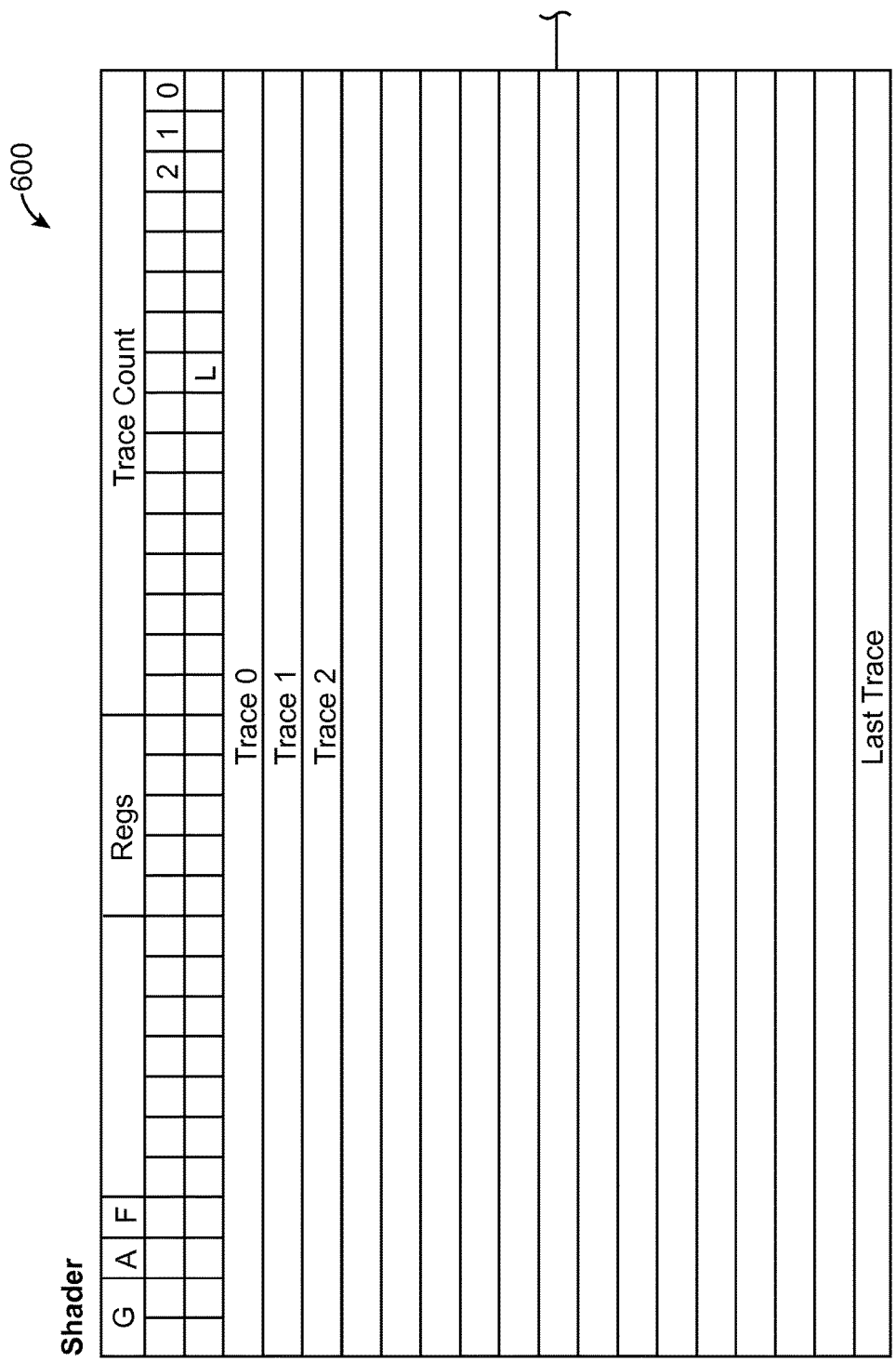
FIG. 7 shows an example of a shader and trace relationship that may be implemented with an embodiment.
Figure 7:
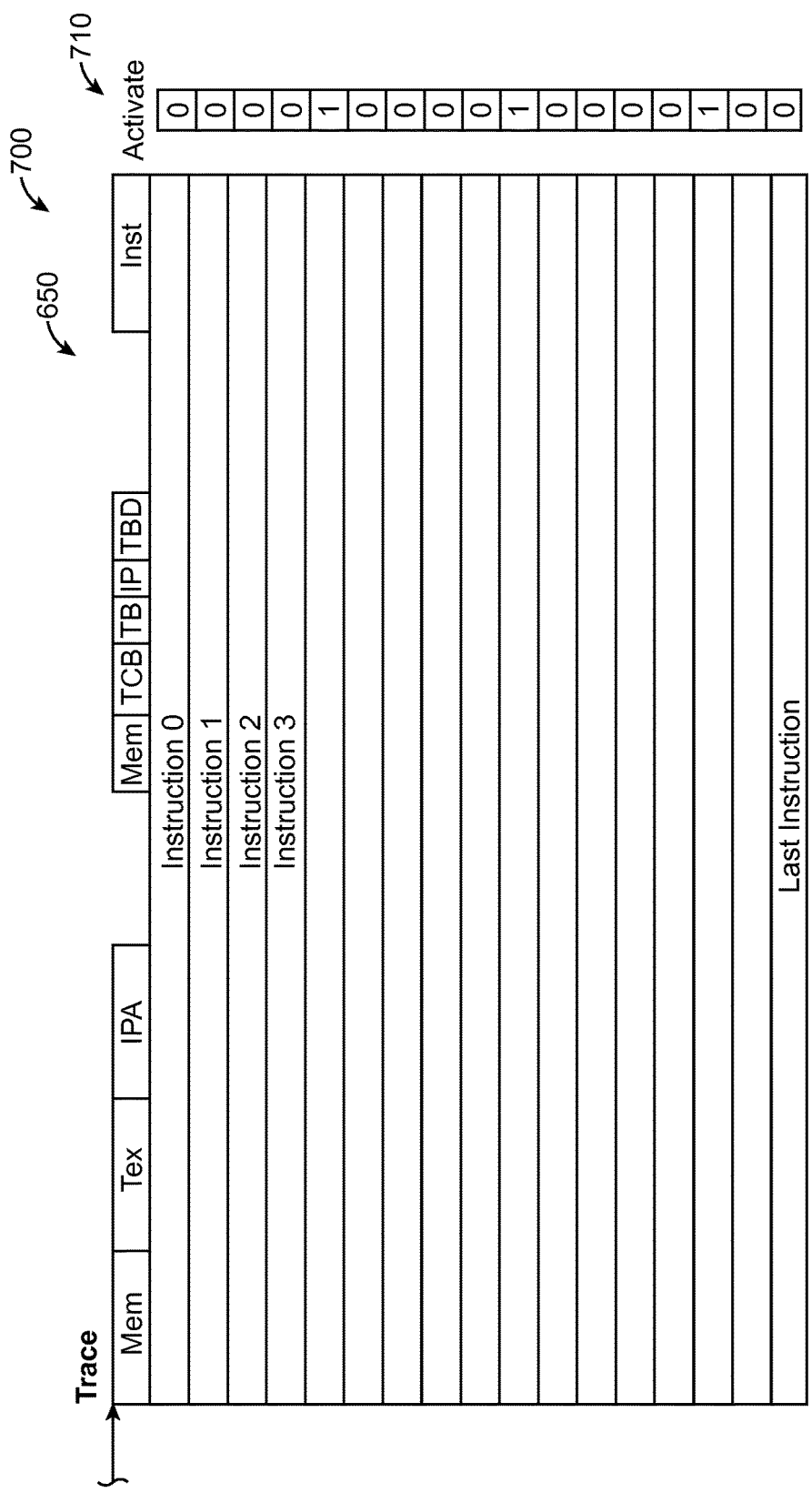

FIG. 7 shows an example 700 of a shader 600 and trace 650 relationship, that may be implemented by one or more embodiments. In one example, both shader 600 and trace 650 are located on cache line boundaries. The addressable instruction space is increased by the same amount 64 Byte cache lines enable 32-bit pointers to point into 38-bit byte-addressable space. The example 700 also shows the activate field 710 that is used to activate the instructions.

Figures 8, 9:
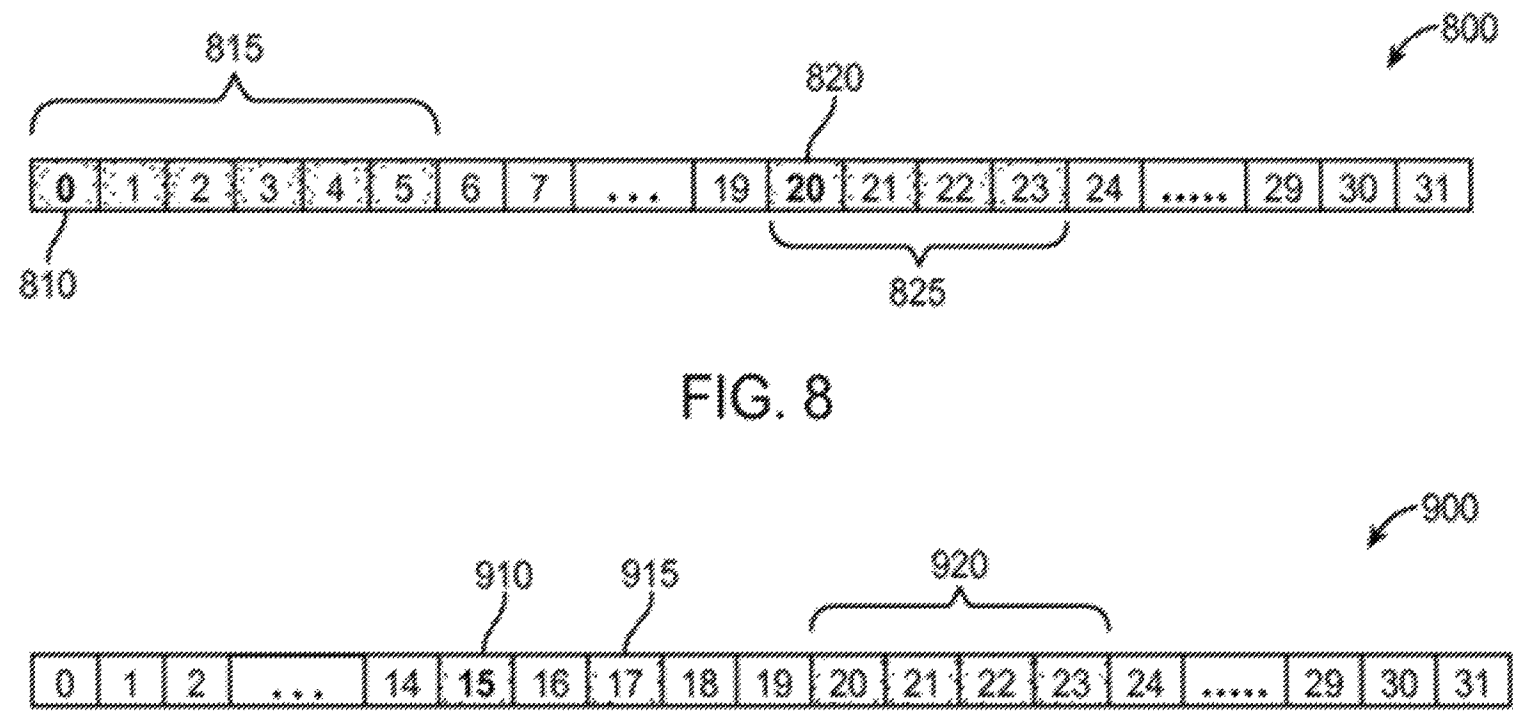

FIG. 8 shows an example 800 of a WARP with two non-trivial thread clusters, according to an embodiment. In one embodiment, the GPU 129 (FIG. 2) is based on the trace architecture 600 (FIG. 6). Each trace is a sequence of instructions with known deterministic latencies that executes without preemption as a single unit. Each trace has a set of input values and computes a set of output values that in turn may be consumed as inputs for other trace(s) in the same program. In one embodiment, in a SIMD/T execution environment (e.g., FIG. 4) the same trace (sequence of instructions) are applied to multiple threads of execution that potentially have different sets of input values. Occasionally, different threads might have exactly the same set of input values and may be combined in thread clusters according to one embodiment.

In one example, a GPU combines threads in groups of limited sizes called WARPs. When the GPU executes a trace it applies the code given in the trace body to all active threads in the WARP that need to execute this code. In one example, consider a WARP with 32 threads that needs to execute a trace with a set of input registers {R0, R1, R2, R3}. In this example, assume that this trace computes a set of output registers {R0, R1} by executing N instructions that do not depend on values computed by other threads. Assume that for threads t0, t1, t2, t3, t4, t5 in some warp the following holds true:

$R0(t0)=R0(t1)=R0(t2)=R0(t3)=R0(t4)=R0(t5)$ $R1(t0)=R1(t1)=R1(t2)=R1(t3)=R1(t4)=R1(t5)$ $R2(t0)=R2(t1)=R2(t2)=R2(t3)=R2(t4)=R2(t5)$ $R3(t0)=R3(t1)=R3(t2)=R3(t3)=R3(t4)=R3(t5).$

In one example, presume that for threads t20, t21, t22, t23 in the same warp it is also true that:

$R0(t20)=R0(t21)=R0(t22)=R0(t23)$ $R1(t20)=R1(t21)=R1(t22)=R1(t23)$ $R2(t20)=R2(t21)=R2(t22)=R2(t23)$ $R3(t20)=R3(t21)=R3(t22)=R3(t23).$

Additionally, assume that no other pair of threads has exactly the same set of values in their respective R0, R1, R2, R3 registers. In this example, while executing this trace the following three clusters of threads comprise: thread cluster 815: {t0, t1, t2, t3, t4, t5}, separate individual thread clusters: {t6} {t7} {t8} {t9} {t10} {t11} {t12} {t13} {t14} {t15} {t16} {t17} {t18} {t19}, thread cluster 825: {t20, t21, t22, t23}, and separate individual thread clusters: {t24} {t25} {t26} {t27} {t28} {t29} {t30} {t31}. In one embodiment, there is no reason to execute all of threads in thread cluster 815 {t0, t1, t2, t3, t4, t5} as it is sufficient to execute just t0 810 and then broadcast the output registers (in this example, R0 and R1) to corresponding R0 and R1 registers in threads t1, t2, t3, t4, t5.

In one embodiment, while thread t0 810 executes trace code, threads t1, t2, t3, t4 and t5 are suppressed, i.e. clock-gated-off. In one example, the thread that will actually execute the code is referred to as a "leader thread" or simply "cluster leader." All other thread members of the cluster are referred to as follower threads. In this example, t0 810 is cluster leader while t1, t2, t3, t4 and t5 are follower threads. Similarly, given the thread cluster 825 of {t20, t21, t22, t23} only thread t20 820 (the cluster leader) is executed and then the computation results are broadcast from the output registers to the follower threads {t21, t22, t23}. In one or more embodiments, by not executing N instructions (N being a positive integer) for all cluster threads but one (i.e., the cluster leader thread) in each thread cluster, and then broadcasting the results to the follower threads, a power savings is achieved by reducing execution of multiple threads in a thread cluster.

FIG. 9 shows an example 900 of a WARP with one sparse thread cluster, according to an embodiment. In one example, clusters do not need to include only threads that are adjacent to each other. Two or more different threads might end up in the same thread cluster even if they are not neighboring each other in the WARP. In one example, if the example described referring to FIG. 8 is changed by forcing threads t15, t17, t20, t21, t22, t23 to have an identical set of input values while all other threads in the WARP would have different inputs, it results with a WARP with only one thread cluster that includes t15 910 (the leader thread) with t17 915 and {t20, t21, t22, t23} 920 as the follower threads.

In one embodiment, the choice of cluster leader is quite arbitrary, in fact since all threads in a thread cluster will compute exactly the same set of values, any thread in a thread cluster may be considered to be the cluster leader. In one example, for simplicity the leader thread may always be chosen as a cluster member with minimal thread ID. Though thread adjacency in general is not required, putting additional restrictions on thread adjacency in a cluster may simplify HW implementation.

In one embodiment, in order to implement the general approach described above HW needs should perform as follows: given a trace input register map provided by a compiler—find thread clusters, and given a trace output register map provided by a compiler—implement a broadcast of computed values. In one example, the compiler is specialized to provide a cost/benefit analysis and mark certain traces as clusterization candidates. In one example, if a number of instructions in a trace (and thus potential power savings) is relatively small, the compiler may choose not to mark such a trace as a candidate for described optimization.

In general, the HW implementation to support this redundancy detection and elimination scheme might be quite costly as the HW has to execute clustering decisions by reading registers from different threads and implement a hash-table with following pair-wise compares to avoid false positives. In one embodiment, for implementation efficiency a simplified version of this approach may be implemented as follows: instead of making thread clusterization decisions per each candidate trace marked by the compiler, an "all-or-none" version of the same concept may be implemented that requires a much simpler HW infrastructure support. In one example, the identity of inputs for the whole program may be detected for avoiding repetitive actions on finding thread clusters. In one embodiment, if the whole program does not explicitly depend on thread IDs and does not have any instructions that may affect the results computed by other threads, it should still be expected that identical input values will result in identical outputs computed by the whole program. In this case only true program outputs are broadcasted, and it will not be necessary to broadcast intermediate values because all follower threads will be suppressed for the whole execution.

Figure 10:
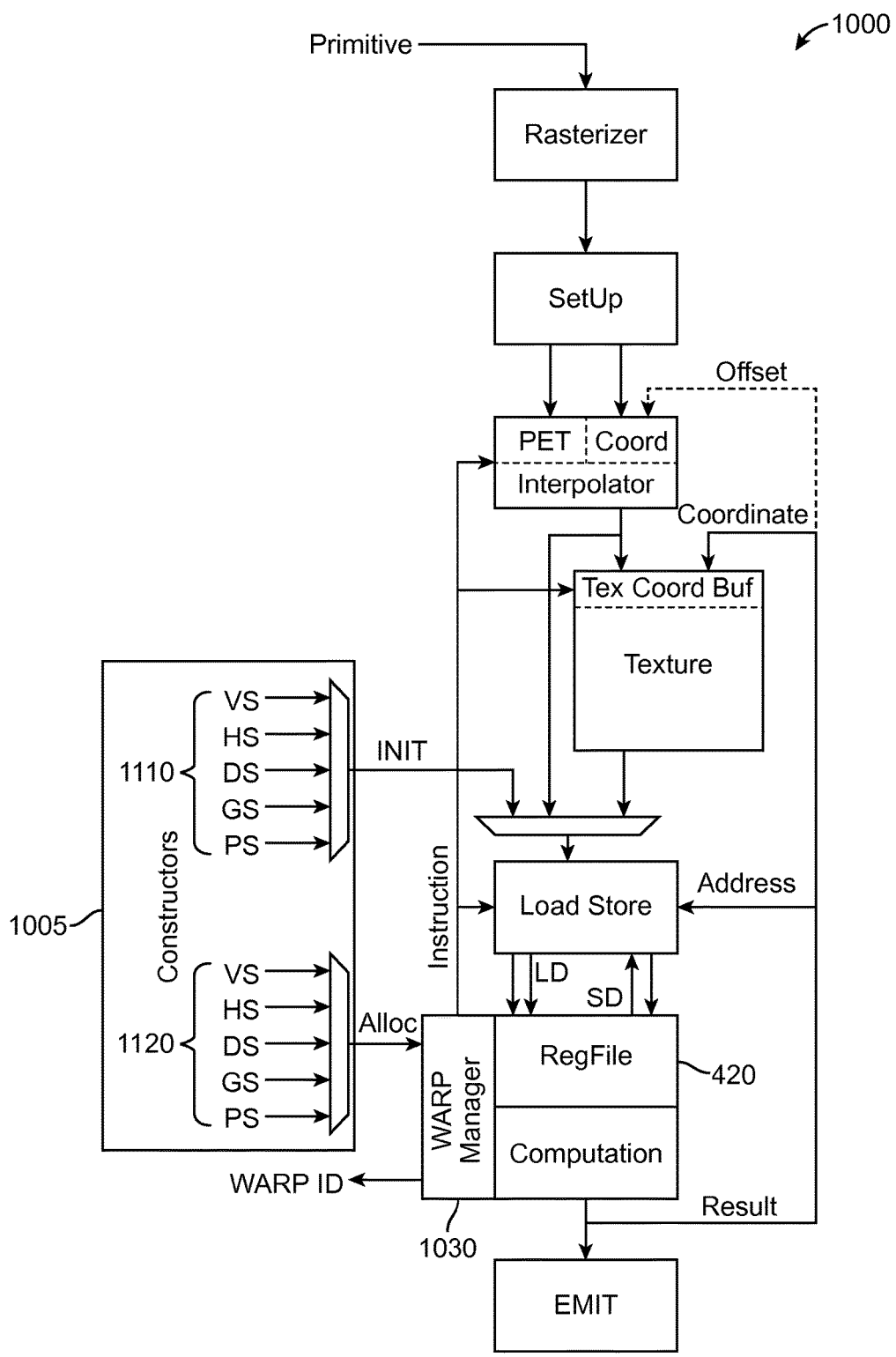
FIG. 10 shows an example block diagram of a processing element and graphics pipeline for a graphics processor that may be implemented with an embodiment.

FIG. 10 shows an example block diagram of a graphics pipeline 1000 for a graphics processor or GPU (e.g., GPU 129, FIG. 2) that may be implemented by one or more embodiments. In one example, a shader core comprises of 4 processing element 400 (FIG. 4) pairs and a number of fixed function units. In one example, some of the fixed function units (e.g., the Load Store) are distributed with the processing element 400 pairs, while others such as Texture and Interpolation are centralized. In one example, many of the fixed function units are illustrated in the example pipeline 1000 along with pertinent conceptual busses. In one example, from the viewpoint of the processing element 400, there are six busses that allow the processing element 400 to interact with the rest of the graphics pipeline 1000.

In one example, the pipeline 1000 includes a 256-bit result plus 32-bits enable bus. The bus serves to deliver results to the next stage of the graphics pipeline 1000 through the EMIT unit, to deliver addresses to the Load Store unit, to deliver texture coordinates to the Texture Coordinate Buffer, and to deliver offset data to the interpolator for interpolation. In one example, the pipeline 1000 includes a 256-bit Load plus a 32-bit enable bus. The enable bus serves to deliver Load data, Texture results, Interpolation results, and Initialization data into the register file 420. Attached to the enable bus, and running two cycles earlier is a Load address bus which delivers the 9-bit register address to the Loop Buffer 410 and 32-write enable bits to the register file 420.

In one example, the pipeline 1000 includes a 256-bit Store Data plus a 32-bit enable bus. The enable bus delivers register read data to the Load Store Unit. In one example, attached to the enable bus and running two cycles earlier is the store address bus. The protocol on the enable bus is to send the address on the pipeline beat, two cycles later there will be a signal indicating if data will be arriving in the subsequent cycle and persisting for 4 beats of the pipeline.

In one example, the pipeline 1000 includes a 64-bit instruction bus. The instruction bus delivers instruction bit patterns and relocated register addresses to the Load Store, Texture, and Interpolator. In one example, most uses of the instruction bus only need 12-odd bits to be transferred, but an instruction may need up to 60-bits to be transferred along with the 9 translated register file address bits.

In one example, the Rasterizer is handed a Primitive in the beginning of the pipeline 1000 flow. In one example, draw commands enter the pipeline 1000 from the graphics driver (or optionally from a command processor). Associated with a draw command is a graphics state (GS) (the current state of the OpenGL state machine for a pipeline implementing the OpenGL API). In one example, the Rasterizer determines if the primitive is in the current Tile, and if so, it sets up the Plane Equation Table for Setup, then proceeds to flow out Quads of pixels into the Interpolator coordinate buffer. The Interpolator uses the Plane Equation Tables for each Quad and interpolates the quads into frame coordinate space. The result may be delivered directly to the texture unit Texture Coordinate Buffer or it may be delivered to the Register File 420 of a processing element 400 (FIG. 4) through the Load Store Unit. In one example, the Texture Unit uses coordinates stored in the Texture Coordinate Buffer and produces textured Quads under control of instructions.

In one example, the constructors 1005 are in charge of allocating and building WARPs for processing. In one example, this process consists of allocating a WARP, associating a Register File 420 with that WARP, filling the Register File 420 with initialization data and signaling the WARP manager 1030 to start this WARP into execution. The Load Store Unit performs memory reference instructions, and provides an interface between other fixed function units and the Register Files 420. In one example, the WARP manager 1030, Register File 420 and Computation Unit comprise the processing element 400 (FIG. 4) including the Loop Buffer 410.

In one example, the EMIT unit routes data emitted from shader programs 1010 and 1020 down the graphics pipeline 1000 to the next stage of processing. Much of the time the emitted data is shipped to shared memory so that a new WARP in a potentially different processing element 400 (FIG. 4) may begin processing the next stage of the graphics pipeline 1000. In one example, the Clip Cull and Viewport (CCV) unit (not shown) of the pipeline 1000 builds an intermediate representation of fully processed primitives that will be processed by the Rasterizer. In one example, the ROP unit (not shown) takes the computed, textured Quads and integrates their data into the frame buffer.

In one example, a graphics processing slice consists of eight processing elements 400 (FIG. 4), a number of fixed function units, and an interface to the GPU network. The GPU delivers a batch of work to the graphics processing slice. The graphics processing slice parses the work into WARP sized bundles, initializes the graphics pipeline 1000 and shader <program>, and assigns threads of work to WARPs which will run on processing elements 400. It should be noted that the example pipeline 1000 is illustrative and provides a guide as how data is routed around the graphics processing slice, and that other configurations and components may be included, components may be substituted, and some components may be eliminated, etc. In one example, there are eight processing elements 400, four Load Store Units, one set of five Constructors 1005, one or more Interpolators, and one or more Texture units.

In one example, the register file 420 of a WARP is controlled by the base offset contained within the WARP data structure. In one example, a register in an instruction is mapped into the Register File 420 by adding the base shifted up by 2 bits in the WARP to the register in the instruction. In one example, the add computation is performed by a 5-bit adder. In one example, a register address presented to centralized fixed function units contains a Processing Element Number, a Register File bit, and a register address. In one example, the low order 2 bits of the register address select the SRAM bank. The Processing element number routes the request to the Register File 420 of the appropriate processing element 400 while the Register File bit selects between a <thread> Register File access or a Scalar Register File access.

In one embodiment, the GPU (e.g., GPU 129, FIG. 2) implements an IPA-PUSH model. This means that in a vast majority of cases, IPAs and following TEXTURE instructions are executed by a fixed-function outside of the shader and prior to starting shader execution. In one embodiment, the values needed by a shader (that have been computed by TEXTURES and possibly IPA instructions) are placed in the register files of each thread in a WARP and conceptually become "input values" for the rest of the shader. Thus, if HW manages to find thread clusters analyzing IPA-TEXTURE output registers and the remaining shader code is free from inter-thread effects, these thread clusters will persist to the end of execution. In one example, HW may execute thread clustering at a texture data return interface. In one implementation, the following procedure may be used for execution:

A) create a Hash Table with 8 entries: each entry has a return texture value, a leader thread ID, and 32 b bit-vector of follower threads.

B) Procedure for each thread:
 i) Look up the color value in a hash table.
 ii) If there is no match and the current entry has no followers, replace, else skip this thread.
 iii) If the thread is the first thread, set a return texture value and leader thread ID, else, if a match, set a bit in a 32 b follower bit-vector.
 iv) Priority encode on the number of follower threads and select four or less entries from the hash-table with one or more follower threads.

In one embodiment, since texture is quad-based, four (4) threads are processed at a time. If a thread does not obtain follower threads quickly, it is eligible for replacement by another thread that hashes into the same location; but once a thread has follower threads it cannot be evicted from its hashed location. At the end of the per-thread procedure listed above, a hash-table results with up to eight (8) clusters, some containing just a single leader thread and others with one or more follower threads. In one example, priority encoding is used to select the top four (4) clusters with the maximum number of follower threads, so that the maximum power savings from clock-gating the most follower threads is obtained.

In one embodiment, the Texture clustering phase generates the following output from the hash-table:

A) An active bit-vector with leading threads and non-clustered threads;
B) Color (texture return) values for all the threads in an active bit-vector;
C) Four clusters each with: Cluster ID, Leader thread ID, and a Bit-vector of follower threads.

In one example, the output from the texture phase typically includes return texture values for all threads. In one example, the active thread bit-vector, which consists of up to four (4) leader threads and other non-clustered threads are sent as output. For each of these threads, the color values from the texture unit are returned. In one example, the color values for the follower threads are not sent since they are the same as the color values for their leader threads. Each of the four cluster IDs is described by the cluster ID, the leader thread ID and a 32 b bit-vector of the follower threads.

In one example, assuming an 8-thread WARP, where ABAA_CDEE, denote that threads 0, 2 and 3 generated color A and threads 6 and 7 generated color E and threads 1, 4 and 5 are not clustered, the leader threads are 0 and 6. The active bit-vector of 1100_1110 includes the non-clustered threads 2, 4, and 5. The return color values are only A, B, C, D and E; the same color for threads 2 and 3 are not repeatedly sent back for instance. In this case, only two hashed locations have one or more follower threads, assuming these are 0 and 1, the example has:

Cluster 0 with leader_thread_id=0, bit-vector of follower threads=0011_0000, Cluster 1 with leader_thread_id=6 and bit-vector of follower threads=0000_0001.

In one embodiment, for cluster insertion in the processing element, a trace may consume multiple texture return values, each with their own clustering. In one example, the warp scheduler (WSQ) gets texture clustering from two (2) or more individual textures and re-clusters:

A) Generate an AND of the bit-vectors indicating clustering;
B) Concatenate cluster IDs for clusterable threads and update the hash table with a count of threads for each concatenated cluster ID;
C) Select up to four (4) clusters with the maximum thread count; and
D) Generate new leader thread for each cluster and follower thread bit-vector.

As an example to illustrate the need for cluster intersection, consider the following example where two distinct textures are consumed by a trace. One of the textures has been clustered by the texture unit to AABB, representing a simplified 4-thread WARP where threads 0 and 1 are in one thread cluster and threads 2 and 3 are in the other thread cluster. The other texture has been clustered to CDDD with thread 0 un-clustered and threads 1, 2 and 3 clustered. Since the trace consumes both textures, the best that can be done is to cluster together only those threads which consume the same values from both textures. In this example, threads 2 and 3 consume (B, D) and may be clustered. Threads 0 and 1 can no longer be clustered because even though both consume A from the first texture, they consume distinct C and D from the second texture. Hence, the WSQ has to perform a cluster intersection and generate an EFGG clustering where E=(A, C), F=(A, D) and G=(B, D). Following is one hardware scheme to implement this intersection.

In one embodiment, a thread is going to be clustered only if it is clustered in both textures. In this case, one has 1111 for the first texture indicating all threads are clustered and 0111 for the second texture indicating that thread 0 is not clustered. The AND is 0111. In one example, the concatenation step takes the cluster ID from the first texture and appends it to the cluster ID from the second texture, so the result is: (00_XX, 00_00, 01_00, 01_00). The table is updated for the clusterable threads which are 1, 2 and 3. The table contains [00_00→1, 01_00→2]. Since only 01_00 has a thread count>1, that is the only group that is clusterable after the intersection. The new leader thread is thread 3 from a leading one detect, and the follower bit-vector is 0001.

One or more embodiments may be implemented for vertex shaders. Vertex shaders have attribute and position inputs that are fetched from some memory locations. In order to implement one or more embodiments to vertex shaders, the HW implements cluster detection and an insertion scheme in the load-store unit (LSU). In this case, the incoming position and attribute values are treated the same way as the treatment of values returned by texture instructions in the PUSH-IPA model; and if the shader code is free from cross-thread dependencies, these thread clusters computed on a shader entry will persist for the whole execution of the shader.

One or more embodiments obtain power savings for a SIMD/T architecture by limiting execution to one thread in a thread cluster making clusterization decisions at the trace boundary. They also offer a simplified version of the same idea that allows the HW to find clusters once in the beginning of shader execution without having to re-clusterize threads later on. One or more embodiments implement procedures to detect and insert thread clusters based on return values from the texture unit or the load store unit.

Figure 11:
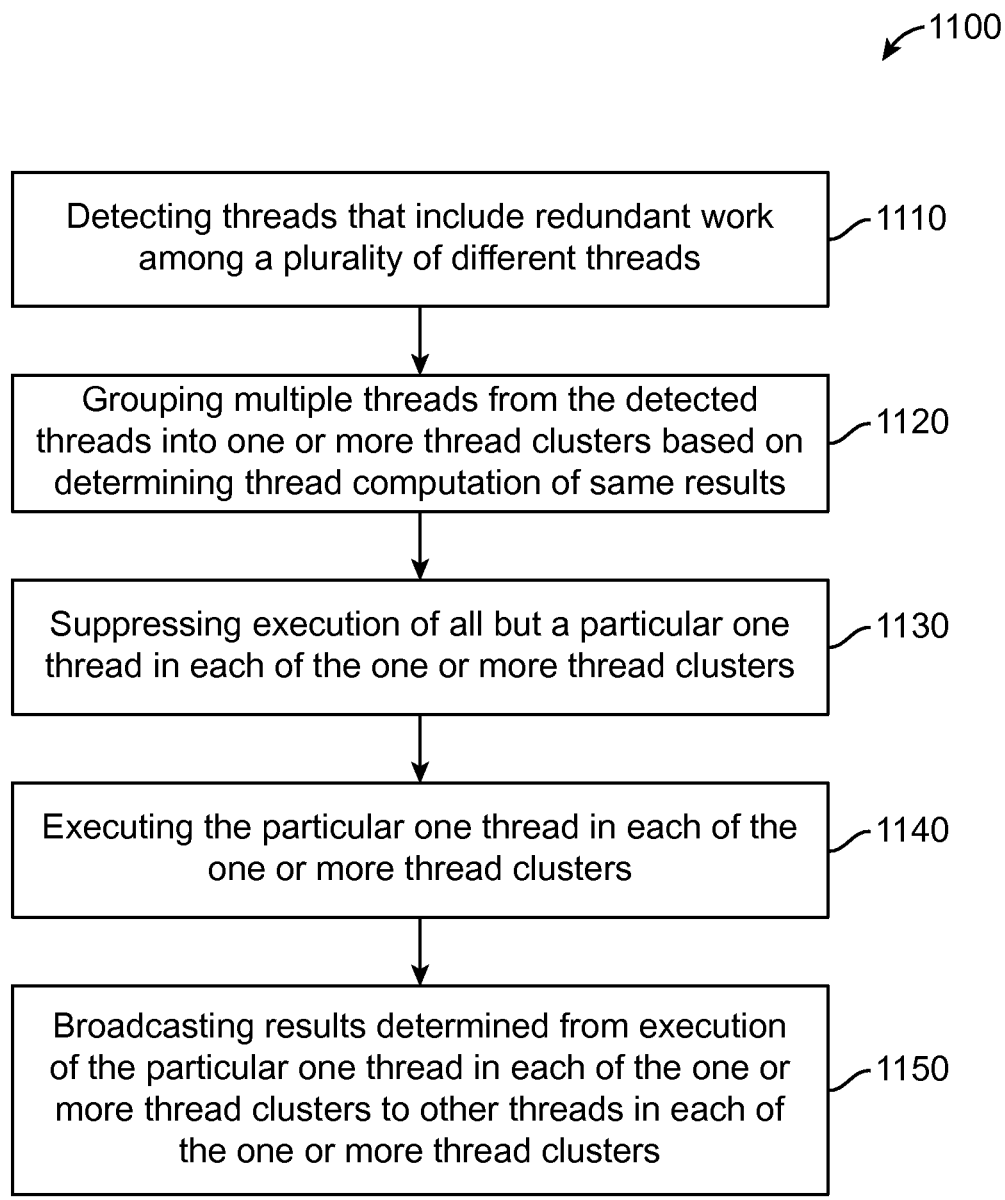
FIG. 11 shows a block diagram of a process for reducing execution of redundant threads in a processing environment, according to one embodiment.

FIG. 11 shows a block diagram of a process 1100 for reducing execution of redundant threads in a processing environment (e.g., a SIMD/T processing environment, such as a GPU 129, FIG. 2, FIG. 4 architecture, Graphics Pipeline 1000, etc.). In block 1110, threads that include redundant work among many different threads are detected. In block 1120, multiple threads from the detected threads are grouped into one or more thread clusters based on determining same thread computation results. In block 1130, execution of all but a particular one thread in each of the one or more thread clusters are suppressed. In block 1140, the particular one thread in each of the one or more thread clusters are executed. In block 1150, results determined from execution of the particular one thread are broadcasted in each of the one or more thread clusters to other threads in each of the one or more thread clusters.

In one embodiment, process 1100 may provide that the detecting includes analyzing dependencies of the many of different threads to determine if any identical sequences of instructions from different threads depend on values computed by other threads during compilation by a compiler. Process 1100 may further include analyzing potential reduction in power consumption in the processing environment based on the size of identical sequences of thread instructions without dependencies and redundancy computations based on a number of inputs for the many different threads.

Process 1100 may further provide that the detecting threads that include redundant work includes identifying identical sequences of instructions from the many different threads that have an identical set of input values. Identifying identical sequences of instructions may include reading from one of input registers for each of the many different threads or from output registers of a texture Interpolator, and implementing a data structure with following pair-wise compares of input registers of each of the plurality of different threads for avoiding false positive results.

In one embodiment, process 1100 may provide that the detecting further includes mapping the input registers of each of the many different threads that have identical values with the implemented data structure. The grouping may further include grouping the multiple threads with the identical sequences of instructions and the identical set of input values that will compute exactly same results into the one or more thread clusters. In one embodiment, process 1100 may provide that the grouping further includes identifying any cluster intersections across different identical sequences of instructions with a scheduler, and re-grouping intersected thread clusters by concatenating cluster ID and updating a bit-vector of threads in the one or more thread clusters.

In one embodiment, process 1100 may provide that the particular one thread in each of the one or more thread clusters is designated as a cluster leader thread, where each cluster leader thread has a minimum ID of the threads in a thread cluster, and the suppressing execution may include clock-gating off the execution of all non-cluster leader threads in the one or more thread clusters.

In one embodiment, process 1100 may provide that the broadcasting of the results includes broadcasting the results computed by each cluster leader thread to other threads in its thread cluster using an output register map from the compiler. In one embodiment, for process 100 the processing environment is included in a GPU of a mobile electronic device (e.g., electronic device 120, FIG. 2).

Figure 12:
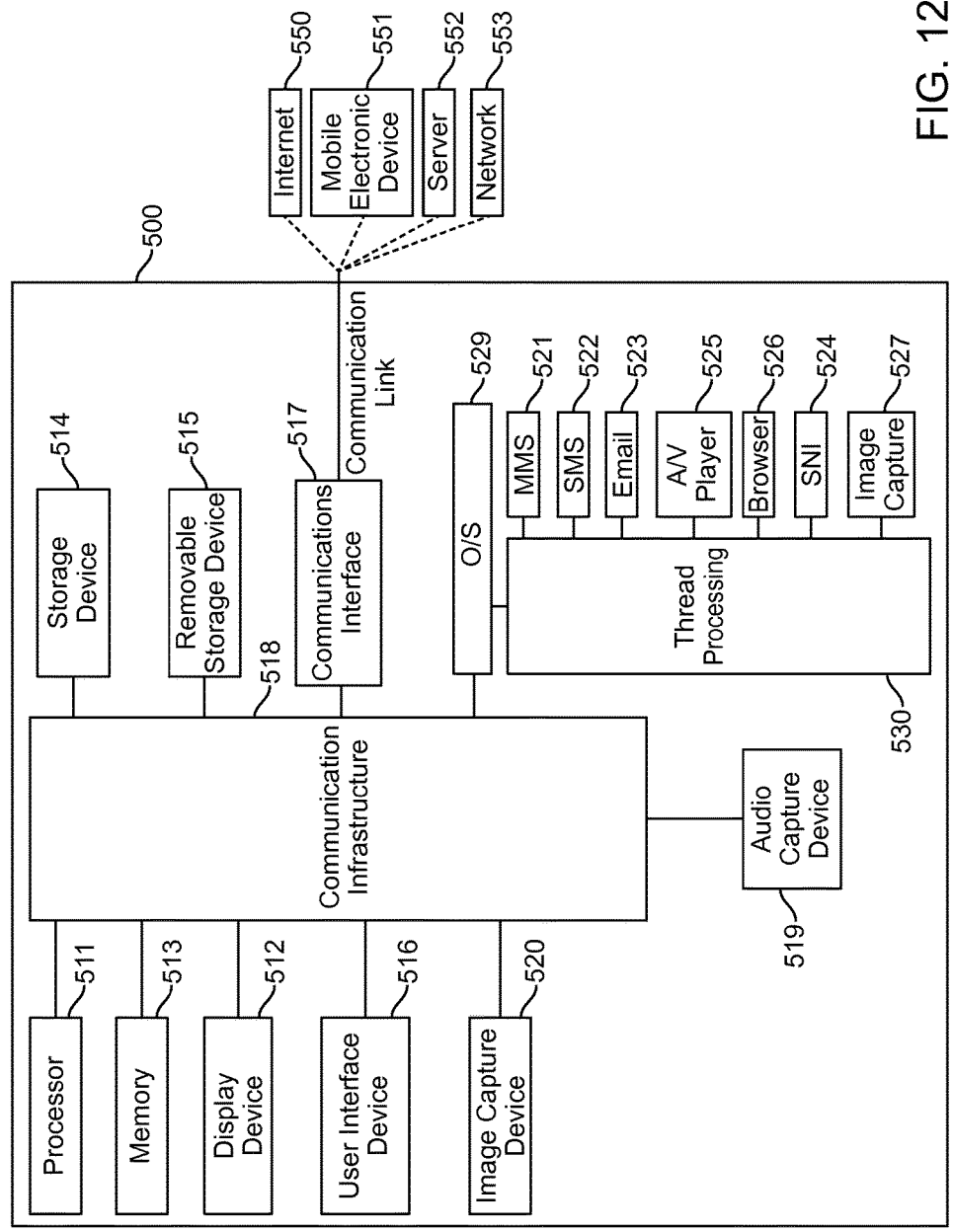
FIG. 12 is a high-level block diagram showing an information processing system comprising a computing system implementing one or more embodiments.

FIG. 12 is a high-level block diagram showing an information processing system comprising a computing system 500 implementing one or more embodiments. The system 500 includes one or more processors 511 (e.g., ASIC, CPU, etc.), and may further include an electronic display device 512 (for displaying graphics, text, and other data), a main memory 513 (e.g., random access memory (RAM), cache devices, etc.), storage device 514 (e.g., hard disk drive), removable storage device 515 (e.g., removable storage drive, removable memory interface, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as Wi-Fi, Cellular), a network interface (such as an Ethernet card), a communications port, or a PCMCIA slot and card).

The communication interface 517 allows software and data to be transferred between the computer system and external devices through the Internet 550, mobile electronic device 551, a server 552, a network 553, etc. The system 500 further includes a communications infrastructure 518 (e.g., a communications bus, cross-over bar, or network) to which the aforementioned devices/interfaces 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one implementation of one or more embodiments in a mobile wireless device (e.g., a mobile phone, tablet, wearable device, etc.), the system 500 further includes an image capture device 520, such as a camera of camera interface 128 (FIG. 2), and an audio capture device 519, such as a microphone 122 (FIG. 2). The system 500 may further include application interfaces, such as MMS interface 521, SMS interface 522, email interface 523, social network interface (SNI) interface 524, audio/video (AV) player 525, web browser 526, image capture interface 527, etc.

In one embodiment, the system 500 includes a thread processing interface 530 that may implement thread processing similar as described above referring to FIGS. 3-10, and the pipeline 1000 (FIG. 10). In one embodiment, the thread processing interface 530 may implement the process of flowchart 1100 (FIG. 11). In one embodiment, the thread processing interface 530 along with an operating system 529 may be implemented as executable code residing in a memory of the system 500. In another embodiment, the thread processing interface 530 may be provided in hardware, firmware, etc.

As is known to those skilled in the art, the aforementioned example architectures described above, according to said architectures, can be implemented in many ways, such as program instructions for execution by a processor, as software modules or interfaces, microcode, as computer program product on computer readable media, as analog/logic circuits, as application specific integrated circuits, as firmware, as consumer electronic devices, AV devices, wireless/ wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module, interface or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for reducing execution of redundant threads in a processing environment, the method comprising:
   detecting threads that include a non-preemptive trace code and comprise an identical sequence of instructions among a plurality of different threads;
   grouping multiple threads from the detected threads into one or more thread clusters based on the non-preemptive trace code;
   suppressing execution of all but a particular one thread in each of the one or more thread clusters;
   executing the particular one thread in each of the one or more thread clusters; and
   broadcasting results determined from execution of the non-preemptive trace code included in the particular one thread in each of the one or more thread clusters to other threads in each of the one or more thread clusters,
   wherein the grouping further comprises:
   identifying any cluster intersections across different identical sequences of instructions with a scheduler; and
   re-grouping intersected thread clusters by concatenating cluster identification (ID) and updating a bit-vector of threads in the one or more thread clusters.

2. The method of claim 1, wherein the detecting comprises analyzing dependencies of the plurality of different threads to determine if any identical sequences of instructions from different threads depend on values computed by other threads during compilation by a compiler.

3. The method of claim 1, further comprising analyzing potential reduction in power consumption in the processing environment based on size of identical sequences of thread instructions without dependencies and redundancy computations and based on number of inputs for the plurality of different threads.

4. The method of claim 3, wherein the non-preemptive trace code comprising the identical sequence of instructions has an identical set of input values.

5. The method of claim 4, wherein the identifying identical sequences of instructions comprises:
   reading from one of input registers for each of the plurality of different threads or from output registers of a texture interpolator; and
   implementing a data structure with following pair-wise compares of input registers of each of the plurality of different threads for avoiding false positive results.

6. The method of claim 5, wherein the detecting further comprises:
   mapping the input registers of each of the plurality of different threads that have identical values with the implemented data structure.

7. The method of claim 4, wherein the grouping further comprises:
   grouping the multiple threads with the identical sequences of instructions and the identical set of input values that will compute exactly same results into the one or more thread clusters.

8. The method of claim 7, wherein:
   the particular one thread in each of the one or more thread clusters is designated as a cluster leader thread, wherein each cluster leader thread has a minimum ID of the threads in a thread cluster; and
   the suppressing execution comprises clock-gating off the execution of all non-cluster leader threads in the one or more thread clusters.

9. The method of claim 8, wherein the broadcasting of the results comprises broadcasting the results computed by each cluster leader thread to other threads in its thread cluster using an output register map from the compiler.

10. The method of claim 1, wherein the processing environment comprises a single instruction multiple thread (SIMT) or single instruction multiple data (SIMD) processing architecture.

11. The method of claim 10, wherein the processing environment is included in a graphics processing unit (GPU) of a mobile electronic device.

12. A non-transitory computer-readable medium having instructions which when executed on a computer perform a method comprising:
    detecting threads that include a non-preemptive trace code and comprise an identical sequence of instructions among a plurality of different threads;
    grouping multiple threads from the detected threads into one or more thread clusters based on the non-preemptive trace code;
    suppressing execution of all but a particular one thread in each of the one or more thread clusters;
    executing the particular one thread in each of the one or more thread clusters; and
    broadcasting results determined from execution of the non-preemptive trace code included in the particular one thread in each of the one or more thread clusters to other threads in each of the one or more thread clusters,
    wherein the grouping further comprises:
    identifying any cluster intersections across different identical sequences of instructions with a scheduler, and
    re-grouping intersected thread clusters by concatenating cluster identification (ID) and updating a bit-vector of threads in the one or more thread clusters.

13. The medium of claim 12, wherein the detecting comprises analyzing dependencies of the plurality of different threads to determine if any identical sequences of instructions from different threads depend on values computed by other threads during compilation by a compiler.

14. The medium of claim 12, further comprising analyzing potential reduction in power consumption in the processing environment based on size of identical sequences of thread instructions without dependencies and redundancy computations and based on number of inputs for the plurality of different threads,
    wherein the detecting threads that include the non-preemptive trace code comprises identifying the identical sequence of instructions from the plurality of different threads that has an identical set of input values.

15. The medium of claim 14, wherein the identifying identical sequences of instructions comprises:
    reading from one of input registers for each of the plurality of different threads or from output registers of a texture interpolator; and
    implementing a data structure with following pair-wise compares of input registers of each of the plurality of different threads for avoiding false positive results.

16. The medium of claim 15, wherein the detecting further comprises:
    mapping the input registers of each of the plurality of different threads that have identical values with the implemented data structure.

17. The medium of claim 14, wherein the grouping further comprises:
    grouping the multiple threads with the identical sequences of instructions and the identical set of input values that will compute exactly same results into the one or more thread clusters.

18. The medium of claim 17, wherein the particular one thread in each of the one or more thread clusters is designated as a cluster leader thread, wherein each cluster leader thread has a minimum ID of the threads in a thread cluster; and
    the suppressing execution comprises clock-gating off the execution of all non-cluster leader threads in the one or more thread clusters.

19. The medium of claim 18, wherein the broadcasting of the results comprises broadcasting the results computed by each cluster leader thread to other threads in its thread cluster using an output register map from the compiler.

20. The medium of claim 12, wherein the processing environment comprises a single instruction multiple thread (SIMT) or single instruction multiple data (SIMD) processing architecture.

21. The medium of claim 20, wherein the processing environment is included in a graphics processing unit (GPU) of a mobile electronic device.

22. A graphics processor for an electronic device comprising:
    one or more processing elements coupled to a memory device, wherein the one or more processing elements are configured to:
    detect threads that include a non-preemptive trace code and comprise an identical sequence of instructions among a plurality of different threads;
    group multiple threads from the detected threads into one or more physical thread clusters based on the non-preemptive trace code;
    suppress execution of all but a particular one thread in each of the one or more thread clusters;
    execute the particular one thread in each of the one or more thread clusters; and
    broadcast results determined from execution of the non-preemptive trace code included in the particular one thread in each of the one or more thread clusters to other threads in each of the one or more thread clusters,
    wherein one or more processing elements are further configured to:
    group the multiple threads with the identical sequences of instructions and the identical set of input values that will compute exactly same results into the one or more thread clusters based on:
    identifying any cluster intersections across different identical sequences of instructions with a scheduler; and
    re-grouping intersected thread clusters by concatenating cluster identification (ID) and updating a bit-vector of threads in the one or more thread clusters.

23. The graphics processor of claim 22, wherein the detecting comprises analyzing dependencies of the plurality of different threads to determine if any identical sequences of instructions from different threads depend on values computed by other threads during compilation by a compiler.

24. The graphics processor of claim 23, wherein the one or more processing elements are further configured to:
    analyze potential reduction in power consumption in the processing environment based on size of identical sequences of thread instructions without dependencies and redundancy computations and based on number of inputs for the plurality of different threads,
    wherein detection of threads that include the non-preemptive trace code comprises identifying the identical sequence of instructions from the plurality of different threads that has an identical set of input values.

25. The graphics processor of claim 24, wherein:
the one or more processing elements are further configured to identify identical sequences of instructions by:
  reading from one of input registers for each of the plurality of different threads or from output registers of a texture Interpolator; and
  implementing a data structure with following pair-wise compares of input registers of each of the plurality of different threads for avoiding false positive results;
the one or more processing elements are further configured to the detect threads that include the non-preemptive trace code by:
  mapping the input registers of each of the plurality of different threads that have identical values with the implemented data structure; and
the one or more processing elements are further configured to group multiple threads by:
  grouping the multiple threads with the identical sequences of instructions and the identical set of input values that will compute exactly same results into the one or more thread clusters.

26. The graphics processor of claim 25, wherein the particular one thread in each of the one or more thread clusters is designated as a cluster leader thread, wherein each cluster leader thread has a minimum ID of the threads in a thread cluster; and
  wherein suppress execution comprises clock-gating off the execution of all non-cluster leader threads in the one or more thread clusters.

27. The graphics processor of claim 26, wherein the broadcast of the results comprises broadcasting the results computed by each cluster leader thread to other threads in its thread cluster using an output register map from the compiler.

28. The graphics processor of claim 22, wherein the graphics processor operates in a processing environment that comprises a single instruction multiple thread (SIMT) or single instruction multiple data (SIMD) processing architecture.

29. The graphics processor of claim 22, wherein the electronic device comprises a mobile electronic device.

* * * * *